United States Patent [19]

Kitagawa

[11] Patent Number: 4,517,649

[45] Date of Patent: May 14, 1985

[54] AUTOMATIC DIE-INTERCHANGING CONTROL SYSTEM OF A PRESS MACHINE

[75] Inventor: Shinichi Kitagawa, Mikawa, Japan

[73] Assignee: Kabushiki Kaisha Komatsu Seisakusho, Tokyo, Japan

[21] Appl. No.: 391,178

[22] Filed: Jun. 23, 1982

[51] Int. Cl.$^{3}$ .............................................. G06F 15/46

[52] U.S. Cl. .................................... 364/472; 364/476; 364/475; 72/446; 72/448

[58] Field of Search ............... 364/472, 476, 184, 185, 364/475, 171; 72/446, 448, 442, 30, 263, 405, 404; 100/99

[56] References Cited

U.S. PATENT DOCUMENTS

| | | | |
|---|---|---|---|
| 3,727,442 | 4/1973 | Ridgway et al. | 72/446 |
| 3,878,773 | 4/1975 | Smit | 72/446 |
| 3,945,230 | 3/1976 | Tomioka et al. | 72/30 |
| 4,188,815 | 2/1980 | Mizushima | 72/446 |
| 4,343,210 | 8/1982 | Kuroyone | 72/442 |
| 4,364,764 | 12/1982 | Farkas et al. | 364/476 |
| 4,370,705 | 1/1983 | Imazeki et al. | 364/185 |
| 4,402,208 | 9/1983 | Sibler | 72/263 |
| 4,402,721 | 9/1983 | Ericson et al. | 364/476 |
| 4,408,521 | 10/1983 | Schelli et al. | 72/448 |
| 4,433,620 | 2/1984 | Kiyosawa | 100/99 |

FOREIGN PATENT DOCUMENTS 56-95429 8/1981 Japan .

*Primary Examiner*—Jerry Smith
*Assistant Examiner*—Louis Woo
*Attorney, Agent, or Firm*—Spensley Horn Jubas & Lubitz

[57] ABSTRACT

In a die interchanging operation for a press which includes steps of used-die-demounting, bolster driving and new-die-mounting, an automatic die-interchanging control system comprises a judging circuit for outputting a signal if no unfinished steps exist before the last finished step among those which have finished their operations and a control unit for resuming the operation from a step immediately subsequent to the last finished step in response to the output from the judging circuit, whereby the die interchanging operation can be started from any step of the operation.

The automatic die-interchanging control system further comprises a lamp lighting control circuit together with indication lamps, which enables to inform an operator of the current situation of the die interchanging operation.

8 Claims, 4 Drawing Figures

AUTOMATIC DIE-INTERCHANGING CONTROL SYSTEM OF A PRESS MACHINE

BACKGROUND OF THE INVENTION

This invention relates to an automatic die-interchanging control system for use in press machines. A prior art automatic die-interchanging control system for automatically interchanging dies in a press machine is disclosed in Japanese Patent Application No. 107999/1973 entitled "METHOD FOR AUTOMATIC INTERCHANGING OF DIES IN PRESS MACHINE". However, in such prior art, the automatic die-interchanging control must always start from the first step in the die-interchanging operation, and starting the die-interchanging control from intermediate steps was impossible. Accordingly, when the die-interchanging operation had been stopped at an intermediate step, returning again to the first step was required when resuming the operation, resulting in operational losses. In addition, since each situation of the die-interchanging operation was confirmed through visual inspection on the press machine, an operator had no means to verify correct operational situations of a die-interchanging operation.

SUMMARY OF THE INVENTION

Accordingly, this invention has been accomplished in consideration of the above-mentioned disadvantages in the prior art and an object of this invention is to provide an automatic die-interchanging control system of a press machine capable of starting the operation of automatic die-interchanging in a press machine from any step of the operation process.

Another object of this invention is to provide an automatic die-interchanging control system capable of informing an operator of the situations of the die-interchanging operation by lighting up or flickering of indication lamps.

According to this invention, operational efficiency of the die-interchanging operation is improved thus shortening the time required for the operation.

It should be noted that this invention is applicable not only to ordinary sheet metal press but also to transfer press, forging press and many others.

The above and other objects and advantages of this invention will become more clear from the following description with reference to the accompanying drawings.

BRIEF DESCRIPTION OF THE INVENTION

In the accompanying drawings:

FIG. 1 is a block diagram illustrating a typical die-interchanging procedure; and FIG. 2 through FIG. 4 are sequential control circuit diagrams of an embodiment according to this invention.

DETAILED DESCRIPTION OF THE INVENTION

Figure 1:
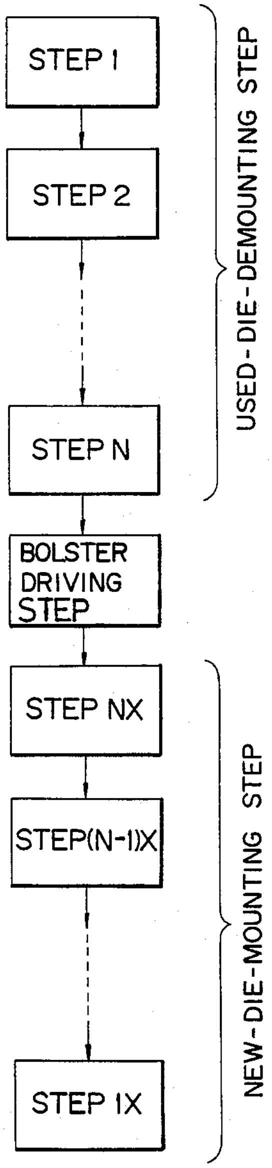

Referring now to FIG. 1, a typical operation of die-interchanging in a press machine consists of used-die-demounting steps from 1 to the N, a bolster driving step, and new-die-mounting steps from NX to 1X. Hereupon, the used-die-demounting step is a step for demounting a used die (die which has been mounted on the press machine), the bolster driving step is a step for transferring the used die on a bolster from a predetermined location on the press machine to a predetermined location away from the press machine and for transferring a new die (die to be mounted and used hereafter) on the bolster from a predetermined location away from the press machine to a predetermined location on the press machine, and the new-die-mounting step is a step for mounting the new die on the press machine. The new-die mounting steps consist of completely reverse operations to the used-die-demounting steps. That is, step NX of the new-die-mounting steps operates in reverse order to step N of the used-die-demounting steps, and in the same way each step from N-1 to 1X of the new-die-mounting steps operates in reverse order to each corresponding step from N-1 to 1.

According to this invention, the automatic die-interchanging control is possible from any step among the above mentioned steps.

Figure 2:
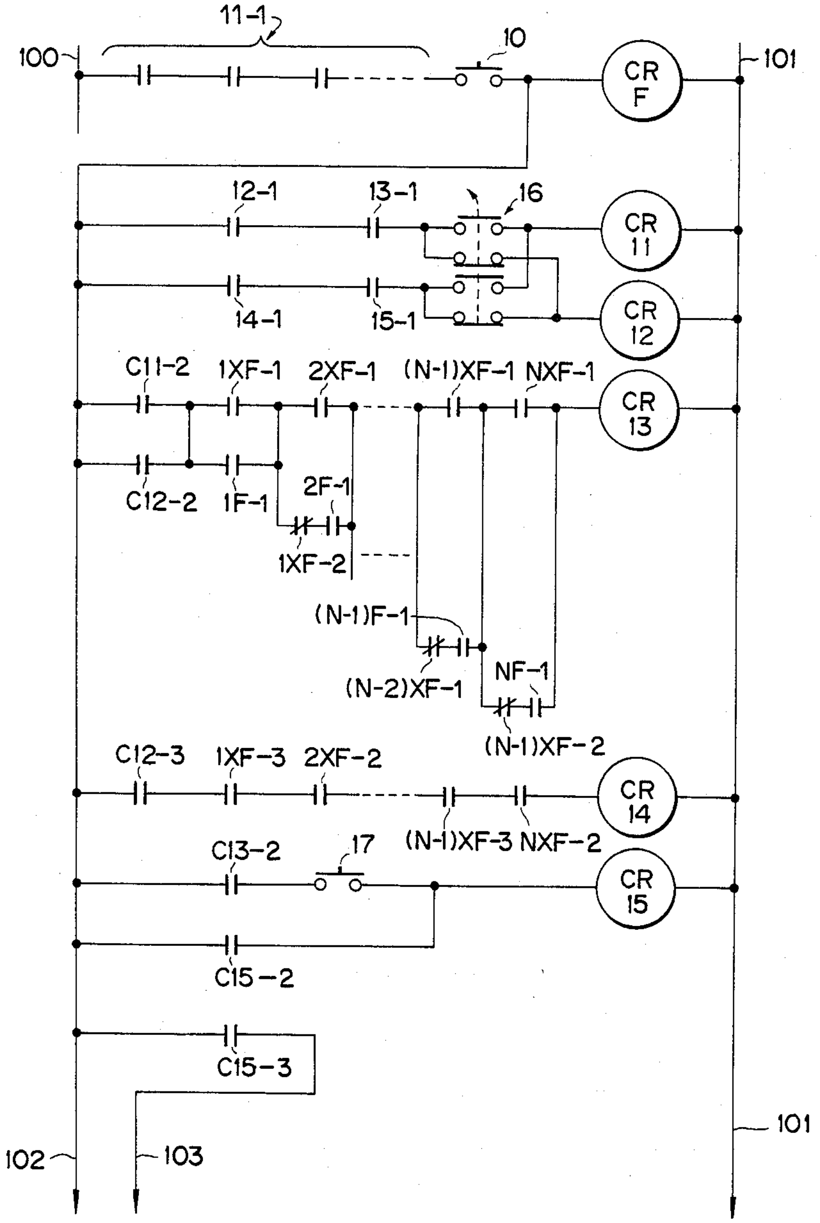
Figure 3:
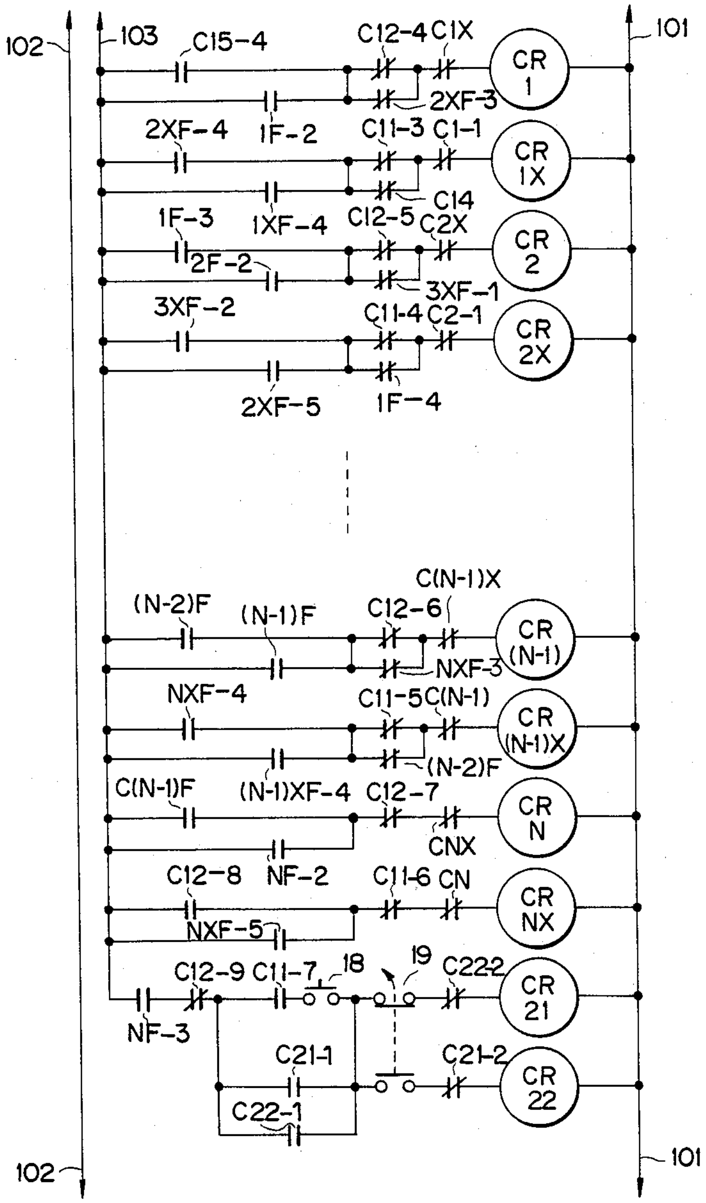
Figure 4:
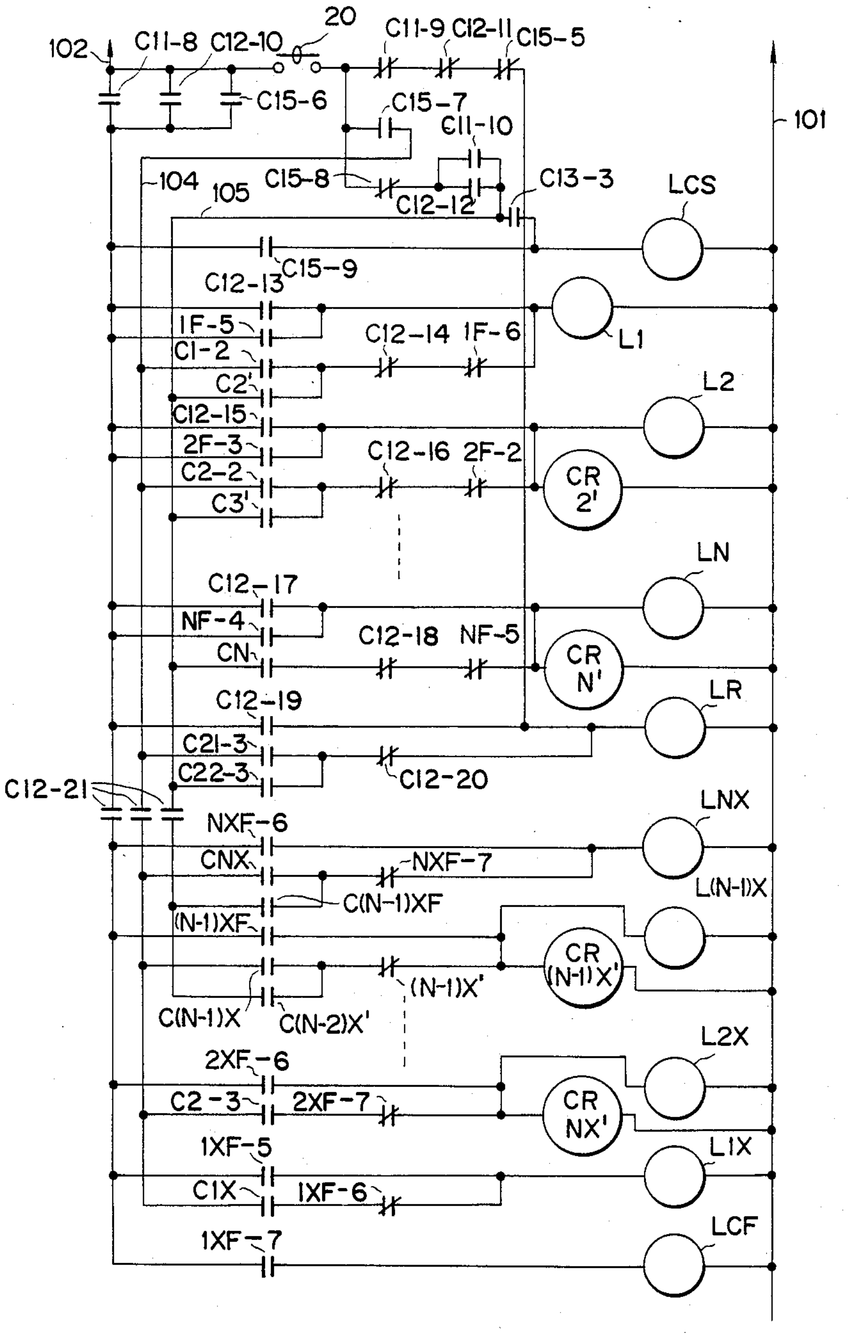

Referring to FIGS. 2 through 4, lines 101, 102 and 103 shown in FIG. 2 are connected to the corresponding lines 101, 102 and 103 shown in FIG. 3, respectively, and lines 102 and 101 shown in FIG. 3 are respectively connected to the corresponding lines 102 and 101 shown in FIG. 4. FIG. 2 relates to a control circuit unit which enables to start automatic control of die-interchanging, FIG. 3 to an output control circuit unit which controls each step, and FIG. 4 to an indication lamp lighting control circuit unit which controls lighting and flickering of each indication lamp. For the convenience of explanation, the same reference symbols are used on relay contacts which are driven by the same relay coil in FIGS. 2 through 4 even though they are different contacts.

In FIG. 2, a predetermined operating voltage (power supply is not illustrated) is applied across the line 100 and the line 101. A switch 10 is for selecting the modes of automatic die-interchanging control, and is turned "on" when the automatic die-interchanging control takes place. A normally opened contact group 11 operates when a push button for emergency stop is pushed down, when air pressure is not enough, and when a main motor operates unusually, etc. and is installed as an interlocking device for urgent stop. Accordingly, all contacts of the normally opened contact group 1 are "on" entirely during normal operation. With the automatic die-interchanging control mode selected, an auxiliary relay CRF operates, and simultaneously power supply voltage is set up on the line 102, and the system is in the automatic die-interchanging control mode.

Auxiliary relays CR11 and CR12 are for deciding whether the current step is a die-demounting or die-mounting step. This decision-making is carried out in accordance with the relative location of the bolster carrying dies to be interchanged and the switched situations of a changeover switch 16 which switches the command for interchanging of bolster. That is, a contact 12-1 is the one which turn "on" when a first bolster (not illustrated, hereafter called front bolster) is at the predetermined location on the press machine, a contact 13-1 is the one which turns "on" when a second bolster (not illustrated, hereafter called rear bolster) is at the predetermined location out of the press machine, a contact 14-1 is the one which turns "on" when the rear bolster is at the predetermined location on the press machine, and a contact 15-1 is the one which turns "on" when the front bolster is at the predetermined location out of the press machine. When the front bolster is at the predetermined location on the press machine and the rear bolster is at the predetermined location out of the press machine with the changeover switch 16 switched to the side of "on" command of the rear bolster (to the side opposite to that illustrated), the auxiliary relay CR11 is actuated and there is an indication that the used-die-demounting step is in operation. The auxiliary relay CR12 is actuated and there is an indication that the new-die-mounting step is in operation when the switch 16 is switched to the side "on" command of the rear bolster (to the illustrated side). Also, when the rear bolster is at the predetermined location on the press machine, and the front bolster is at the predetermined location out of the press machine, the auxiliary relay CR12 is actuated, and there is an indication that the new-die-mounting step is in operation when the changeover switch 16 switched to the side of "on" command of the rear bolster. Similarly the auxiliary relay CR11 is actuated there is an indication and that the used-die-demounting step is in operation when the switch 16 is switched to the side of "on" command of the front bolster.

The auxiliary relay CR13 is to judge whether the starting of the automatic die-interchanging control is possible or not at intermediate steps. This judging takes place as follows. If the operation up to step N has been carried out at present, the start of the automatic die-interchanging control becomes possible under the condition that the operation of the all steps before step N is finished completely (i.e., no unfinished steps), if any step before step N is unfinished, the starting of automatic die-interchanging becomes impossible, and this starting becomes possible after all unfinished steps have been finished.

A contact C11-2 is the normally opened contact of the auxiliary relay CR11, a contact C12-2 is the normally opened contact of the auxiliary relay CR12, contacts from 1F-1 to NF-1 are the normally opened contacts which operate with each step from 1 to N finished, contacts from 1XF to NXF are the normally opened and the normally closed contacts which operate with each step from 1 to NX finished, and an auxiliary relay CR13 operates under the condition that no unfinished steps exist before the last one among the steps which have finished their operation.

An auxiliary relay CR14 operates when the contacts C12 and 1XF-3 to NXF-2 are all "on", namely, when die-interchanging operation has been finished.

When a normally opened contact C13-2 of the auxiliary relay CR13 is "on", an auxiliary relay CR15 operates when a switch 17 for starting automatic die-interchanging control is pushed down, and there is an indication that the automatic die-interchanging is currently taking place. The normally opened contact C15-1 in the circuit of the auxiliary relay CR15 is for keeping the auxiliary relay CR15 latched once it has been energized. With the auxiliary relay CR15 operated, the normally opened contact C15 becomes "on", whereby the supply voltage is set up on the line 103.

Referring to FIG. 3, a power supply control unit includes auxiliary relays CR1, CR1X, CR2, CR2X, . . . , CRN, CRNX, CR21, CR22 which operate devices (not illustrated) relating to each step. For example, with the auxiliary relay CR1 operated, the operation of step 1 is carried out; with the auxiliary relay CR1X operated, the operation of step 1X is carried out; and in the same way, with the relays CR2, 2R2X, . . . CRN, CRNX operated, the operations of step 2, step 2X, . . . , step N, step NX are carried out, respectively. With the auxiliary relay CR21 operated, the front and the rear bolsters are driven forward; with the auxiliary relay CR22 operated, the front and the rear bolsters are driven backward.

The requirements for the auxiliary relay CR1 to be operated are that the auxiliary relay CR15 is in operation (in automatic die-interchanging control), the auxiliary relay CR12 is not in operation (not in the new-die-mounting step, that is, the system is either in the used-die-demounting or the bolster driving step,) and the auxiliary relay CR1X is not in operation the 1st step is finished. Until a normally closed contact 2XF-3 is provided which operates after completion of step 2X so as to keep the operation of the auxiliary relay CR1 latched until step 2X finishes even though the new-die-mounting step starts and the normally closed contact C12-4 becomes "on".

The requirements for the auxiliary relay CR2 to be operated are that step 1 is finished, the auxiliary relays CR12 and CR2X are not in operation, and step 2 has been finished. The state of this auxiliary relay CR2 is kept latched until step 3X is finished by the normally closed contact 3XF-1. The requirements for the operation of the auxiliary relays CR3, . . . CR(N-1) are set in the same way; for the auxiliary relay CRN, such requirements are that step N-1 is finished, the auxiliary relays CR12 and CRNX are not in operation, and step N has been finished. The auxiliary relay CRN does not operate, when the auxiliary relay CR12 is operated (i.e. when the new die-mounting process is started).

The auxiliary relay CR21 which controls the forward movement of the front and the rear bolsters, operates with a drive start switch 18 for starting driving pushed down, under the conditions that step N is finished, that the auxiliary relay CR12 is not in operation (in the new-die-mounting step), that the auxiliary relay CR11 is in operation (in the used-die-demounting step), that a switch 19 is switched to the side of "on" command of the front bolster, and that the auxiliary relay CR22 is not in operation. This auxiliary relay CR21 is kept latched by the contact C21-1.

Also the auxiliary relay CR22 which controls backward movement of the front and the rear bolsters, operates with the switch 18 pushed down under the conditions that the Nth step is finished, that the auxiliary relay CR12 is not in operation, that the auxiliary relay CR11 is in operation, and that the switch 19 is switched to the side of "on" of the rear bolster (opposite side as illustrated). This auxiliary relay CR22 is kept latched by the contact C22-1. As for the control of driving the front and rear bolsters, it is so arranged that the control starts only when the drive start switch is pushed down, and this arrangement is for the consideration of safety for operators and also for preventing accidents causing damages to the machine.

Further the requirements for the auxiliary relay CRNX to be operated are that the auxiliary relay CR12 is in operation (in the new-die-mounting step), that the auxiliary relay CR11 is not in operation (not being in the used die-demounting step), that the auxiliary relay CRN is not in operation, and that step NX has been finished; the requirements for the auxiliary relay CR(N-1)X to be operated are that step NX is finished, that the auxiliary relays CR11 and CR(N-1) are not in operation, and that step N-1 has been finished; and the operation of this auxiliary relay CR(N-1) is kept latched until step N-2 is finished by the normally closed contact (N-2)F. In the same way, the requirements for the operation of the auxiliary relays CR(N-1) . . . CR2X are set, and the requirements for the operation of the auxiliary relay CR1X are that step 2X is finished, that the auxiliary relay CR11 and CR1 are not in operation, and that step 1X has been finished. The operation of this auxiliary relay CR1X is kept latched until the automatic die-interchanging control is finished by the normally closed contact C14.

Referring to FIG. 4, an indication lamp lighting control circuit includes indication lamps L1 . . . LN and LNX . . . L1X corresponding to step 1 through step N and step NX through step 1X, respectively, an indication lamp LR to indicate the starting of the automatic die-interchanging control, an indication lamp LCF to indicate the completion of the automatic die-interchanging control, and a flickering contact 20 to control flickering of the indication lamps.

First of all, the operation of the indication lamp lighting control circuit will be explained. The indication lamp lighting control circuit lights up the indication lamps corresponding to the finished steps and flickers the indication lamps corresponding to the unfinished processes when there are unfinished steps among those before the last one which have been finished. For example, when steps 2, 3 and 4 are finished but step 1 is not finished, the auxiliary relay CR13 is not in operation and the auxiliary relay CR15 does not operate even with and automatic die-interchanging control start switch 17 pushed down. Also, when the front and the rear bolsters are at the predetermined location, the auxiliary relay CR11 is in operation and the auxiliary relay CR12 is not. Accordingly, a normally opened contact C11-8 is "on", a normally closed contact C11-9 is "off", a normally opened contact C12-10 is "off", a normally closed contact C12-11 is "on", a normally opened contact C15-6 is "off", a normally closed contact C15-5 is "on", normally closed contacts 2F-2, 3F (not shown) and 4F (not shown) are "off", normally opened contacts 1F-5, 2F-3, . . . , 1XF-5, 7 are "off", and normally closed contacts 1F-6, 2F-2, . . . 1XF-6 are "on". When the normally opened contacts C11-8, 2F-3, 3F (not shown), 4F (not shown) become "on", the indication lamps L2, L3 (not shown), L4 (not shown) light up, and auxiliary relays CR2', CR3' (not shown), CR4' (not shown) operate. However, in this case, as mentioned above, because the normally opened contacts C12-13 and 1F-5 are "on", the output of the flickering contact 20 is applied to the indication lamp L1 through the normally closed contact C15-8, the normally opened contact C11-10, the line 105, a normally opened contact C2' and the normally closed contacts C12-14 and 1F-6, then the indication lamp L1 flickers with the "on" and "off" cycle of the flickering contact 20. Therefore, the indication lamps L2, L3 and L4 light up and the indication lamp L1 flickers; the finished steps are indicated by continuously lit lamps, and the unfinished steps are indicated by flickering lamps. With these unfinished steps finished, the auxiliary relay CR13 operates and the automatic die-interchanging control becomes possible. And then, the indication lamps which were flickering light up continuously, and by the operation of the auxiliary relay CR13, the output of the flickering contact 20 is applied to the indication lamp LCS through the normally closed contact C15-8, the normally opened contact C13-3, the indication lamp LCS flickers, and there is an indication that the automatic die-interchanging control can be started.

When the front and the rear bolsters are not at the predetermined location, each of the auxiliary relays CR11 and CR12 is not in operation, and accordingly the auxiliary relay CR15 also is not in operation; therefore, each of the normally opened contacts C11-8, C12-10 and C15-6 is "off", each of the normally closed contacts C11-9, C12-11 and C15-5 is "on". Accordingly, in this case, the output of the flickering contact 20 is applied to the indication lamp LR through the normally closed contacts C11-9, C12-11 and C15-5, and flickers the lamp LR, and there is an indication that the bolsters are not at the predetermined locations. When the bolsters are driven to the predetermined locations, the auxiliary relay CR11 operates, and the indication lamp goes off, then the above-mentioned situations are reversed. When the automatic die-interchanging control start switch 17 (FIG. 2) is pushed down under the condition that the auxiliary relay CR13 is actuated and the indication lamp LCS is flickering, the auxiliary relay CR15 operates and the automatic die-interchanging control starts its operation. This automatic die-interchanging control starts its operation from the step next to the already finished one.

As exemplified above, if the step is finished up to the 4th process, the auxiliary relays CR1, CR2, CR3 and CR4 are already in operation, the automatic die-interchanging control is actuated by putting auxiliary relays into operation from the CR5 onward, successively. The indication lamps corresponding to the steps in the automatic die-interchanging operation which are already finished are lit by the closing of normally opened contacts 1F-5, 2F-3, . . . , NF-4 and NXF-6, . . . , 1XF-7 which are connected to the line 102 or the line set up through the normally opened contacts C12-21, and by their lighting, there is an indication of the steps which are finished. The indication lamps L1 through LN among the indication lamps corresponding to the steps in operation are supplied with the power and flickered through the normally opened contacts C1-2, C2-2, . . . , CN and CNX, . . . C1X, the normally closed contacts C12-14, 16 and 1F-6, 2F-2, . . . , NF-5. Also, the indication lamp LR is supplied with the power and flickered through the normally opened contact C21-3 or C22-3 (either of the contacts which is "on" during bolster's driving) and C12-20, and the indication lamps LNX, . . . , L1X are supplied with the power and flickered through the normally opened contacts connected to the line 104 set up through the normally opened contact C12-21 and through each of the normally closed contacts NXF-7, . . . , 1XF-6, thus indicating that each of the corresponding steps is in operation. Also, the indication lamps L1 through LN and LR are lit by the normally opened contacts C12-13, 15, 17, 19 connected to the line 102 during the new-die-mounting step.

Also, the power is supplied to an indication lamp LCS through the contact C15-9 connected to the line 102 when the automatic die-interchanging control is in operation, and the indication lamp LCS is lit.

With step 1X finished in this way, the die-interchanging control completes. At this moment, the power is supplied to the indication lamp LCF through the normally opened contact 1XF-7 connected to the line 102 via the normally opened contact C12-21, and lights up the indication lamp LCF. By lighting up of the indication lamp LCF, that the die-interchanging control has been finished is indicated.

Although the above mentioned embodiment is configurated by using the circuit which includes mechanical contacts such as a relay contact, configuration using the circuit in which such mechanical contact is replaced with a semiconductor switching circuit may also be employed.

What is claimed is:

1. An automatic die-interchanging control system for a press machine having a used-die-demounting step including steps 1 to N for demounting a used die from the press machine, a bolster driving step for transferring a bolster carrying a new die to be mounted on the press machine, and a new-die-mounting step including steps NX to 1X respectively corresponding to the steps N to 1 of said used-die-demounting step, wherein said automatic die-interchanging control system comprises:

judging means which outputs a signal under the condition that no unfinished steps exist before a last finished step among those which have finished their operations; and automatic die-interchanging control means for resuming the operation from a step immediately subsequent to said last finished step as an initial step in response to said signal from said judging means.

2. An automatic die-interchanging control system as defined in claim 1, further including a changeover switch for switching a bolster driving command wherein said judging means comprises:

a first judging circuit for judging whether a step currently in operation belongs to said used-die-demounting steps or to said new-die-mounting steps in accordance with the position of said bolster and the state of said changeover switch for switching bolster driving command; and a second judging circuit for judging whether there is an unfinished step in the steps before said last finished step as a function of the output of said first judging circuit and the finish/unfinish situation of said steps 1 to N and NX to 1X, an automatic die-interchanging control being enabled in accordance with output of said second judging circuit.

3. An automatic die-interchanging control system as defined in claim 2, wherein said first judging circuit is a relay circuit having a plurality of contacts which come into operation when said bolster is located at a predetermined location, wherein contacts of said changeover switch and two relay coils of said relay circuit having a plurality of contacts which come into operation when said bolster is located at a predetermined location, wherein contacts of said changeover switch and two relay coils of said relay circuit including (a) contacts of said two relay coils, (b) additional contacts which are operated in accordance with a finish situation of said steps 1 to N and NX to 1X and (c) a relay coil connected to be operated through said contacts and additional contacts.

4. An automatic die-interchanging control system as defined in claim 1, further comprising:

a plurality of indication lamps; and an indication lamp lighting control circuit for controlling lighting of said indication lamps.

5. An automatic die-interchanging control system as defined in claim 4, wherein said indication lamps are provided corresponding to each of said steps in the die-interchanging operation, and said indication lamp lighting control circuit causes indication lamps corresponding to the finished steps to light and indication lamps corresponding to the unfinished steps before the last finished step to flicker prior to the start of automatic die-interchanging control.

6. An automatic die-interchanging control system as defined in claim 5, wherein said indication lamp control circuit causes indication lamps corresponding to finished steps to light and indication lamps corresponding to a step currently in operation to flicker during the automatic die-interchanging control operation.

7. An automatic die-interchanging control system as defined in claim 4, wherein one of said indication lamps is for indicating a start ready situation of the automatic die-interchanging control, and said indication lamp lighting control circuit (a) causes said one indication lamp to flicker under the condition that the automatic die-interchanging control is ready to start and an automatic die-interchanging control start switch is not turned on, and (b) causes said one indication lamp to light during automatic die-interchanging control.

8. An automatic die-interchanging control system as defined in claim 4, wherein one of said indication lamps corresponds to said bolster driving step and said indication lamp lighting control circuit causes said one indication lamp to flicker when said bolster is not located at a predetermined location.

* * * * *